United States Patent [19]
Kugell et al.

[11] Patent Number: 5,729,595
[45] Date of Patent: Mar. 17, 1998

[54] NEVER-BUSY FACSIMILE SERVICE

[75] Inventors: Stanley Kugell, Newton Highlands; David Friend, Boston, both of Mass.

[73] Assignee: Faxnet Corp., Boston, Mass.

[21] Appl. No.: 677,151

[22] Filed: Jul. 9, 1996

[51] Int. Cl.$^6$ .................................................. H04M 11/00
[52] U.S. Cl. ................... 379/100.09; 379/90.01; 358/407; 358/438
[58] Field of Search ............... 379/100, 96–98, 379/94, 93, 67, 88, 89, 211, 210, 201, 100.01, 100.08, 100.09, 100.14, 90.01; 358/402, 403, 407, 434–440, 442, 468

[56] References Cited

U.S. PATENT DOCUMENTS 5,291,302 3/1994 Gordon et al. ..................... 379/100
5,555,100 9/1996 Bloomfield et al. ................ 358/402

*Primary Examiner*—Wing F. Chan
*Attorney, Agent, or Firm*—Sprung Kramer Schaefer & Briscoe

[57] ABSTRACT

A method for providing a never-busy fax service wherein a customer's fax machine appears to be never busy to a caller. The method avoids loop-back charges which limit the usefulness of present implementations of never-busy fax and allow for a nation-wide never-busy fax service utilizing a server with toll-free inbound phone lines.

6 Claims, 6 Drawing Sheets

NEVER-BUSY FACSIMILE SERVICE

BACKGROUND OF THE INVENTION

The present invention relates to two methods of providing a "never-busy" inbound fax service that allows a fax machine appear to be never busy to callers. The present invention overcomes a major drawback of existing schemes for implementing "never-busy" inbound fax service. This major drawback is known as "loop-back-to-server," or simply "loop-back." There is a cost associated with loop-back which limits the economic viability of present never-busy inbound fax services.

A never-busy inbound fax service is useful to businesses and organizations which want 100% availability to incoming faxes, that is to say that a caller never encounters a busy signal. The conventional way to insure high availability is to have two or more fax machines on sequential telephone lines that are provisioned in a "hunt" sequence by the local phone company. In a hunt sequence, if the first fax machine is busy, the call is automatically routed to the phone line on the second machine. If that machine is also busy, then the call is directed to a third machine, if it exists, and so on. The "hunt" sequence is a standard feature offered by nearly all local telephone companies.

Having multiple fax machines on a hunt sequence is an expensive solution, however, and still does not entirely eliminate the possibility of an inbound call reaching a busy signal. A never-busy inbound service can eliminate the need for additional fax machines and provide nearly 100% availability to callers.

A never-busy inbound fax service eliminates all busy signals by automatically forwarding (when the customer's line is busy) incoming calls to a remote fax server which is equipped with a large number of fax ports. To accomplish this forwarding, the customer's local telephone company is instructed to apply a commonly available feature to the customer's phone line called "forward on busy."

An alternative feature offered by most phone companies is "forward on busy/no-answer". Never-busy fax service can be implemented for either the busy or busy/no-answer conditions. Both are referred to simply as "never-busy fax service." When implemented using "forward on busy/no-answer," a caller will never encounter either a busy signal or a no-answer condition on the customer's fax line. A no-answer condition may be caused by the customer's fax machine being out of paper or toner, jammed, turned off, disconnected from AC power or phone jack, or otherwise inoperable.

The fax server answers the incoming fax and stores it on its computer hard disk. The phone number of the fax machine from which the call was forwarded is obtained automatically from the phone company using a feature called "feature group D" which is similar to "caller ID." Feature group D is available to registered long distance carriers.

In present implementations of never-busy inbound fax service, feature group D is not used and the service providers are not registered or tariffed carriers. Consequently, the way that the service provider knows the phone number of the customer whose fax line is being forwarded to the fax server is by assigning a new special phone number for each customer and using "Direct Inbound Dialing," or DID, to determine which customer is calling. For example, Customer A's fax phone line can be set to forward calls on busy to phone number 234-5678. There would be one such number for every customer. If the server receives a call on line 234-5678, then it knows that it is Customer A's fax that is being forwarded. It can then look up Customer A's fax phone number so that it can retry sending the forwarded fax.

In present implementations of never-busy inbound fax service, once the fax has been received and stored, the fax server repeatedly calls the customer's line until it finds it free, at which point it delivers the fax. The loop-back problem comes into play when the server calls the customer's fax line and the server's call is forwarded back to the server because the customer's line is still busy. Existing never-busy services cannot distinguish between a call forwarded from a third party versus a call looping back from the server itself. The currently used method of determining if an incoming call has originated at the fax server is to answer the incoming call and read the fax station ID of the calling fax machine. The fax station ID is usually displayed as a line of print along the very top edge of a fax. If the server's station ID is found, the call is dropped.

Because this method of identifying the calling party requires answering the incoming call, a charge is incurred for the phone call from the server to the customer's fax machine and from the customer's fax machine back to the server. If the server is forced to attempt delivery multiple times before finding the customer's fax line free, the costs associated with the loop-back can render such service economically impractical.

In order to avoid loop-back charges, present implementations of never-busy fax are restricted to those geographic areas known as "free-calling zones." In a free calling zone, there is no incremental charge for a local call. Hence, even though a call is completed in order to determine if the customer's line is still busy, there is no charge for such call.

However, there are only a limited number of free calling zones and the geography of these zones can be changed at any time by local phone companies. Many free calling zones are presently too small to be economically viable. Any time never-busy service is extended beyond a free-calling zone, loop-back charges are incurred and the service may become economically impractical. Because of the costs associated with long-distance charges (including toll-free numbers), wide-area never-busy fax is not practical using conventional methods.

The economics of the loop-back charges precludes the service provider from attempting frequent retries because a cost is incurred with each retry. Since the retry schedule is the principle determinant of the quality of the service, loop-back charges have a direct effect on the quality of the service provided.

SUMMARY OF THE INVENTION

The main object of the present invention is to provide methods of delivering never-busy inbound fax service without incurring loop-back charges.

A further object of the present invention is to employ a digital or analog signature in the ring-back signal in order to allow a server to recognize when a call is being forwarded back to itself.

A still further object of the present invention is to utilize the capabilities of Signaling System 7 (SS7) to test the status of a line prior to making an actual call, thereby avoiding loop-back charges.

Another object of the present invention is to provide a method of delivering never-busy inbound fax service on a nation-wide basis from a central location by forwarding calls to a toll-free nationwide number and utilizing one of the methods described herein to provide retries without incurring loop-back charges.

A still further object of the present invention is to provide a report indicating the present status of all faxes in the incoming and outgoing queues using both voice response systems and the World Wide Web.

The present invention utilizes a digital or analog signature imbedded in the ring-back tone issued by the server upon receiving an incoming call. The ring-back tone is the sound which one normally hears indicating that the called party's phone line is ringing (as opposed to busy). The ring-back tone is generated by the telephone equipment that is the last link in the chain of switches that connects the call originator to the destination. If the fax server's ring-back tone can be made unique so that the server can identify when a call is being forwarded back to the server, then a call can be dropped before it is answered, thereby avoiding the loop-back charge.

In a normal telephone call, the "ring-back tone" which the caller hears originates at the called party's local phone company, or with the telephone switches and equipment at the called party's premises. The present invention calls for the fax server to generate a "ring-back tone" which includes a sequence of bits (called a "signature") which uniquely identifies the fax server's ring-back tone. This sequence of bits can be identified by the caller using either digital or analog methods.

To enable the never busy inbound fax service, the customer's fax line is programmed by the local phone company so that if the line is busy or busy/no-answer, the incoming call is automatically forwarded to the phone number for the fax server. The fax server receives the incoming fax and stores it on a computer mass storage device, such as a hard drive or optical disk drive.

The fax server then commences a retry schedule to attempt delivery of the fax to the intended fax machine. When the fax server dials the destination phone number to attempt delivery of a stored fax, the call will be forwarded back to the fax server if the destination line is still busy. However, the server can recognize that it is calling itself by recognizing the signature in the ring tone. The server can then disconnect before answering the call and therefore incur no loop-back charges.

The avoidance of the loop-back charges makes it possible to offer never busy inbound fax service on a nationwide basis from one centralized server. In accordance with the present invention, a customer's phone line can be set to forward calls on busy to a nationwide toll-free number. This toll free number terminates at the central fax server. The fax server makes a long distance call to attempt delivery of the fax. By avoiding loop-back charges including both the foil-free incoming call and the long distance retry call, it is economically practical to provide never busy incoming service on a nationwide basis using one or more central fax servers.

Another way to implement never-busy inbound fax without incurring loop-back charges involves the use of Signaling System 7 (SS7). SS7 is the digital signal protocol used by most phone companies worldwide that allows telephone switches to exchange information concerning the routing of individual telephone calls. One of features generally supported by SS7 is the ability to determine if a particular telephone number is busy without actually making a call to that number. In accordance with the present invention, SS7 can be used to test a phone number nearly anywhere in the world in a fraction of a second. If the destination's phone number is found to be free, then SS7 sets up and completes a call from the server to the destination fax machine in order to deliver stored faxes.

This method of implementing never busy inbound fax has the advantage of being very fast. It takes less than one second to verify that a particular phone line is still busy. And since there is no incremental cost for repeatedly testing the status of a phone line, the tests can be repeated frequently with the result that the stored fax will be delivered almost the instant that the destination fax machine becomes free.

Further in accordance with the present invention, an alternative use of SS7 to implement never busy inbound fax uses SS7's capability to automatically monitor the status of a line and then notify the caller as soon as the destination phone line hangs up. When using this feature of SS7, the fax server makes one query, asking SS7 to notify the server as soon as the destination phone line is free. Once the server receives notification that the line is free, the fax call is completed. Using this capability of SS7 avoids having to repeatedly query the status of the destination line, thereby freeing up processing time on the server for other tasks.

These embodiments for using SS7 to test the status of the destination phone line without incurring a loop-back charge are representative of specific ways of using SS7 that will vary in different parts of the country or the world, depending on the specific implementations of SS7 in use by the different phone companies in those locations.

In accordance with the present invention, a customer can receive a report on the status of the queue of inbound faxes by using either a voice-response system or by accessing their account on the World Wide Web.

These and other features of the present invention will become more apparent from the detailed description of the invention with reference to the attached drawings, wherein

DETAILED DESCRIPTION OF THE INVENTION

Figure 1:
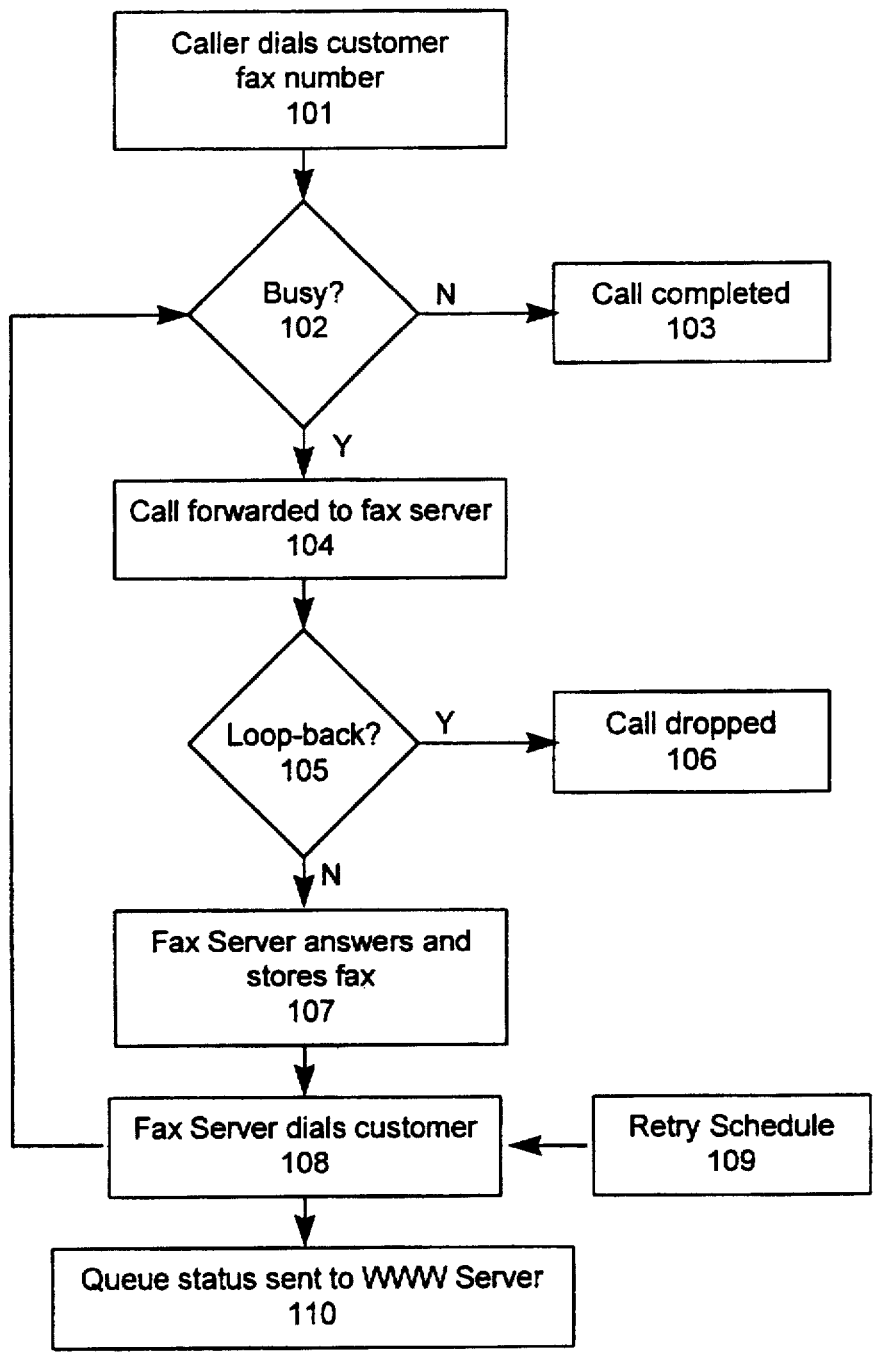
FIG. 1 is a flow chart showing the flow of events in a never-busy fax service implemented according to the present invention.

Referring to FIG. 1, a system according to the present invention is shown wherein never-busy fax service is implemented using loop-back detection to avoid loop-back charges.

The caller initiates a fax call at 101 to the customer's fax line, on which the never-busy fax service has been enabled.

If the customer's fax line is not busy, the call is completed at 103. If the customer's fax line is busy at 102, the local phone company's "forward on busy" feature at 104 automatically forwards the call to a fax server, whose phone number has been supplied to the local phone company. This number can be either a local phone number or a toll-free number. Using a toll-free number allows the never-busy service to be provided on a nation-wide basis from one or more central server locations.

The server, upon detecting an incoming call, initiates a loop-back test at 105 to determine if the incoming call has originated with a caller or with the server. If the loop-back test at 105 detects that the incoming call originated at the server, the call is dropped at 106.

If the loop-back test at 105 determines that the incoming call is not originating with the server, then fax server answers the call at 107, receives the incoming fax, and stores it on the server's mass storage device.

In accordance with a retry schedule at 109, the fax server attempts delivery of the stored fax at 108 to the customer. If the customer's line is still busy at 102, the process is repeated until the call is successfully completed or until the retry schedule is exhausted. If the retry schedule is exhausted, notification of failure to deliver is automatically sent to the sender.

At multiple points in this process, the status of all pending faxes is sent to a WWW server at 110 so that a customer can view the status of the queue of undelivered faxes.

Figure 2:
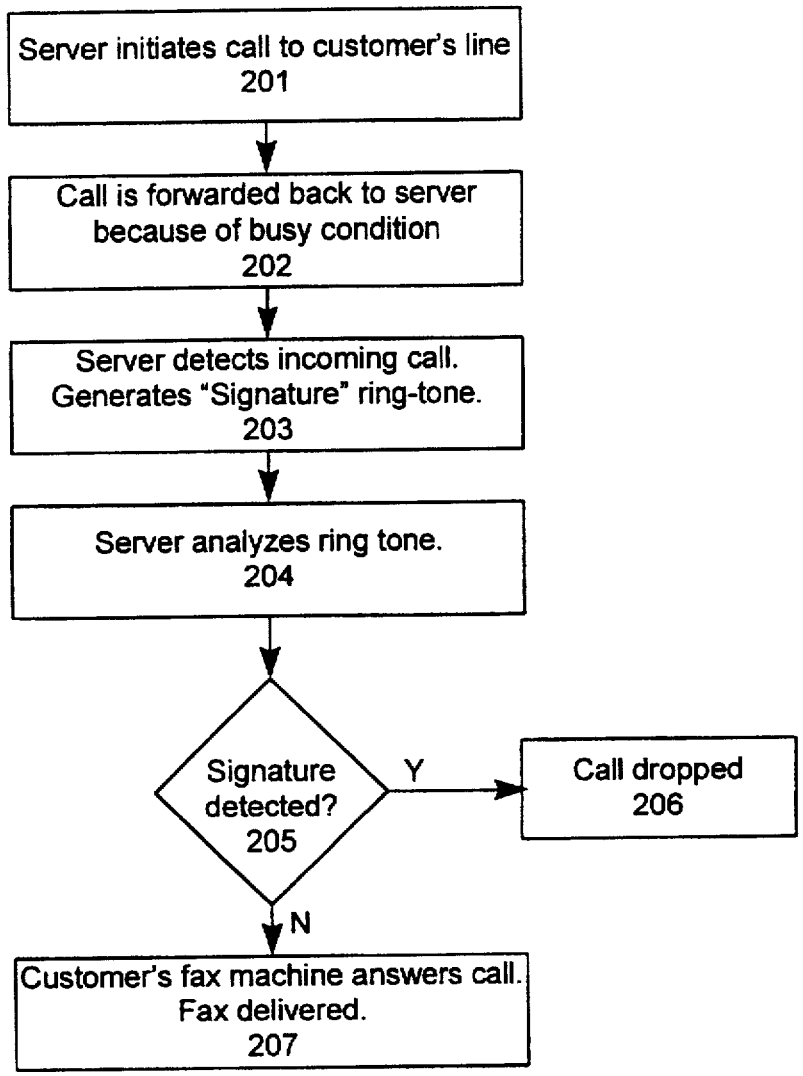
FIG. 2 is a flow chart showing in detail the implementation of the busy test utilizing a ring-back signature according to the present invention.

FIG. 2 shows the logic flow for detecting loop-back utilizing a ring-back signal incorporating a unique signature. Once a fax has been forwarded to the server at 104 because the customer's line is busy (as described above), the server, under control of the retry schedule, initiates a call to the customer's line at 201. If the customer's line is still busy, the call will be forwarded back to the server by the local phone company at 202. The server, upon detecting an incoming call, generates a ring-tone with a unique signature at 203 consisting of a sequence of bits which can be detected by either digital or analog circuitry. The port on the server which originated the call to the customer's line (the "originating port") now hears the ring-tone at 204 and analyzes it to see if the unique signature is present at 205. If the signature is detected at 205, the originating port on the server hangs up and drops the call at 206. If the originating port does not hear the signature in the ring-back, it knows that the customer's fax line is now free and the customer's actual fax machine is answering the call. The fax is transmitted to the customer's fax machine at 207 and the process is complete. The fax server removes the fax from the "pending" list on the WWW server.

Figure 3:
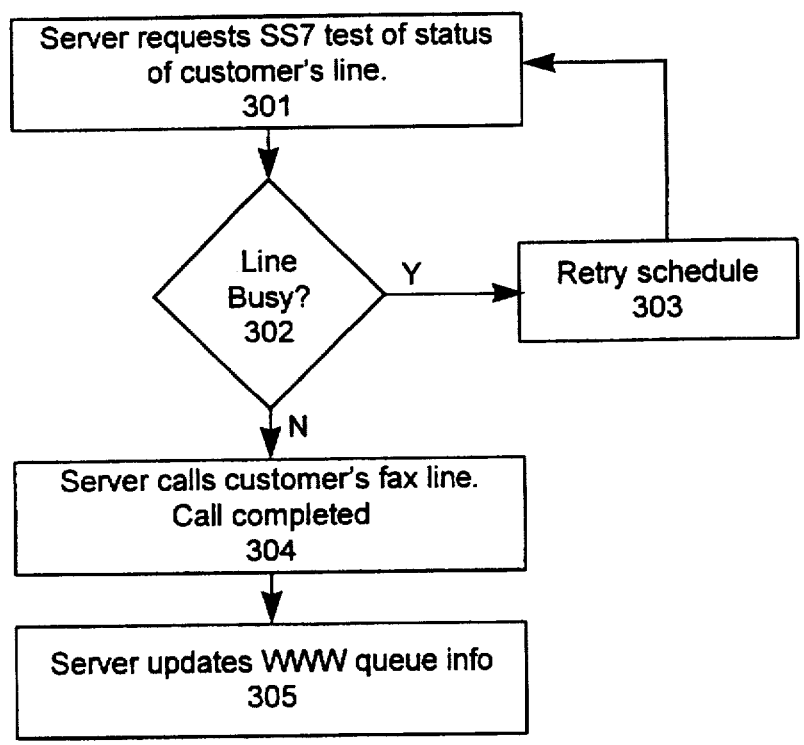
FIG. 3 is a flow chart showing in detail the implementation of the busy test utilizing SS7 to repeatedly test the status of the destination line, according to the present invention.

FIG. 3 shows how loop-back can be avoiding using SS7 to test the status of the customer's line before attempting to deliver a stored fax. The server sends a request to an SS7 server at 301 requesting the status of the customer's. SS7 returns a busy/not busy response at 302. If the line is busy, the retry schedule at 303 waits a predetermined amount of time, and then repeats the request to the SS7 server. If the line is found to be not busy, then the fax server calls the customer's line and delivers the fax at 304. The WWW queue information is updated at 305 indicating that the pending fax has been delivered successfully.

Figure 4:
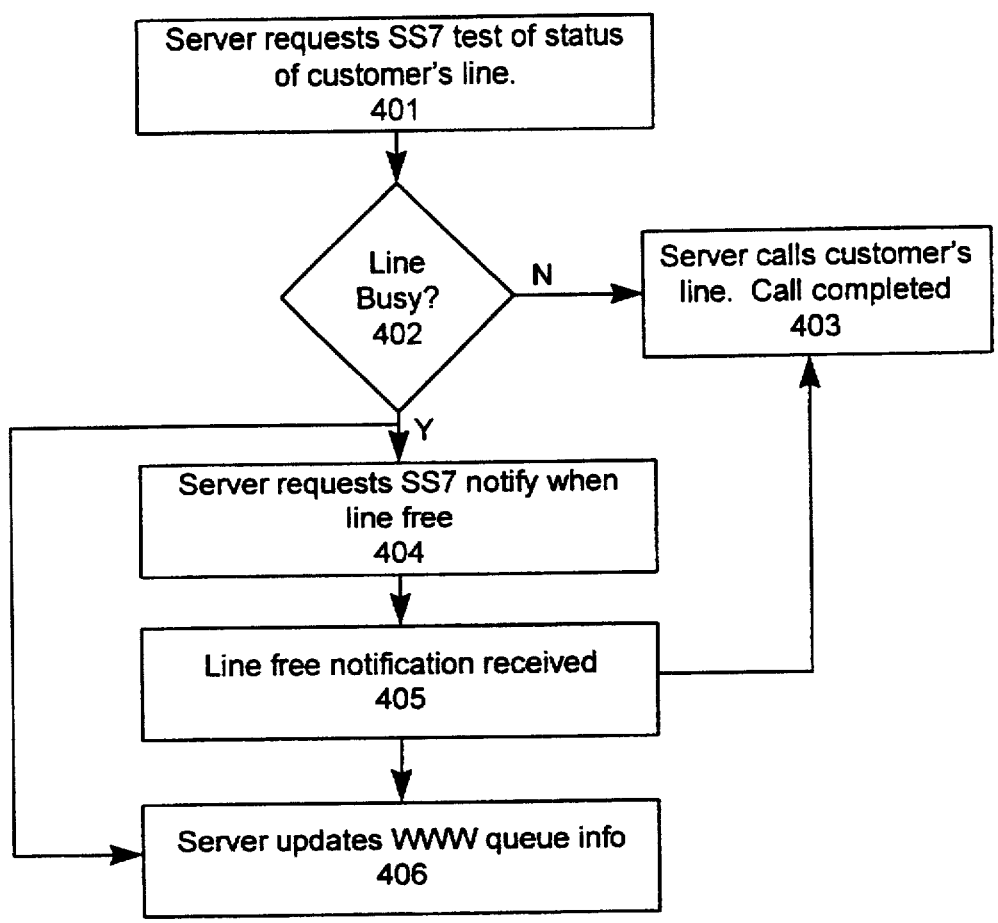
FIG. 4 is a flow chart showing in detail the implementation of the busy test utilizing SS7 to notify the server when the destination line is free.

FIG. 4 shows another embodiment using a different feature of SS7 in which SS7 notifies the server when the customer's line is free, avoiding the necessity of a retry schedule. As in FIG. 3, the server first requests the status of the customer's line at 401. If the line is not busy at 402, then the server initiates a call to the customer's line and completes the delivery of the pending fax at 403. If the line is busy at 402, then the server requests SS7 to notify it at 404 when the customer's line is free. When the line-free notification at 405 is received by the server, the server initiates a call to the customer's line at 403 and the fax is delivered. At appropriate points in this process, the status of the queue on the WWW server is updated at 406.

Figure 5:
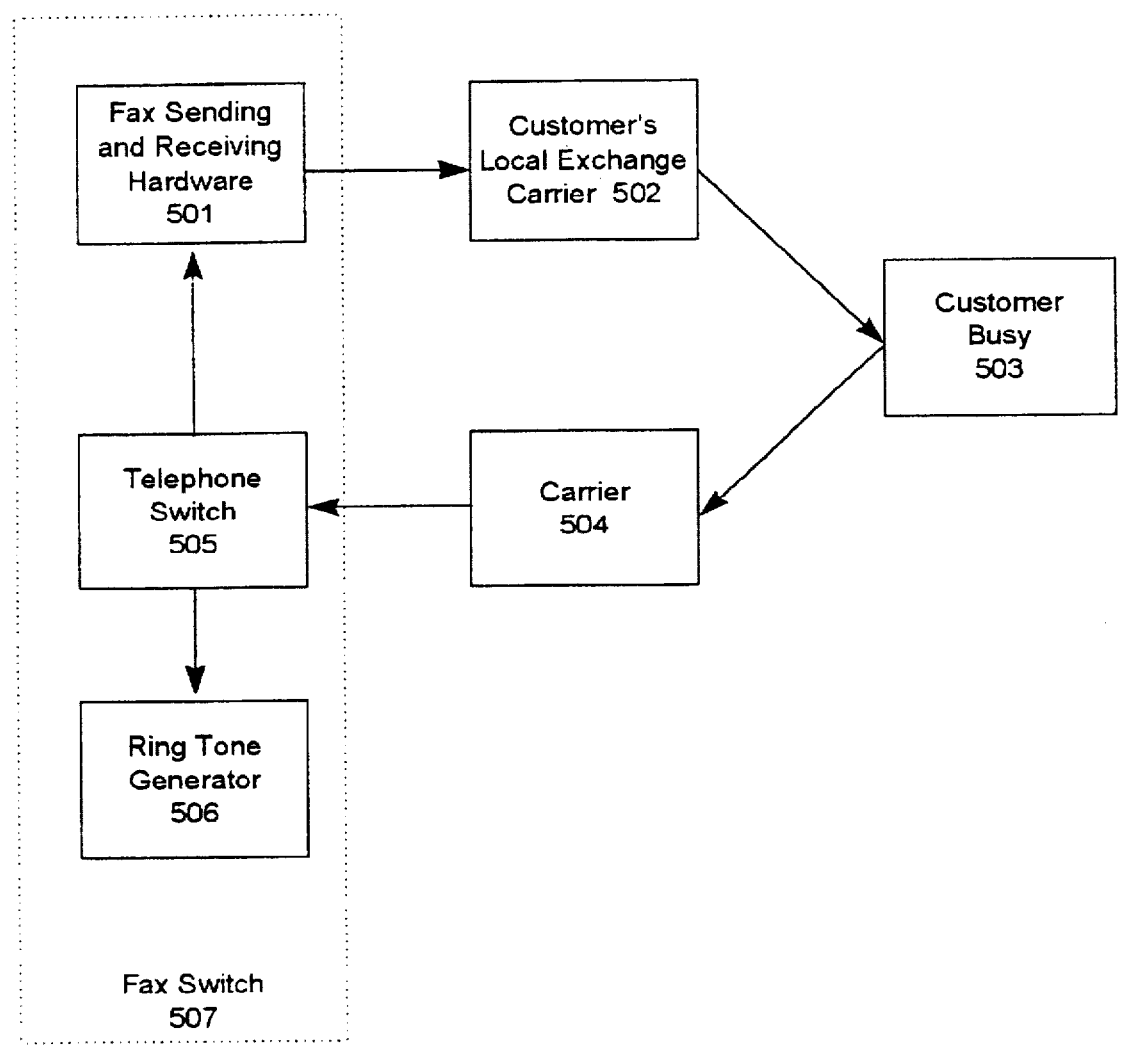
FIG. 5 is a block diagram of the various components necessary to implement never-busy fax service utilizing a unique ring tone signal.

FIG. 5 shows a block diagram of the fax switch and the phone network that transmits a call from the fax server to the customer's phone line and then back to the fax server. The fax switch 507 employs fax sending and receiving hardware 501 that dials the customer's fax phone line. The customer's local exchange carrier 502 detects that the customer's phone line 503 is busy and the call is forwarded to a phone number for the fax switch. The call at this point may be handed off to a carrier 504 that delivers the call back to fax server's internal phone switch 505. In the case where the customer and the fax switch were in different cities, the call from the customer's local exchange to the fax switch would be directed to a toll-free number which would be carried back to the fax switch by a long distance carrier 504. Upon receiving an incoming call, the phone switch 505 connects the incoming call to a ring tone generator 506. The ring tone from the ring generator then travels back through the network to the fax sending hardware where the ring tone can be detected. The ring tone generator is a commercial digital signal processor which is capable of producing a ring tone which consists of a prerecorded sequence of bits. These bits comprise a signature which can be recognized either digitally or by analyzing the spectrum and duration of the ring tone. The fax sending hardware includes a ring tone analyzer (explained in FIG. 6 below) which can be a similar commercial digital signal processor. The ring tone generator is programmed to generate the ring tone for about 3 seconds which is sufficient time for the fax sending hardware to detect the presence of the ring tone signature, disconnect the call, and for the disconnect signal to ripple through the phone network until the phone line calling the fax switch 507 is also dropped. This process is explained in more detail in FIG. 6 below.

Figure 6:
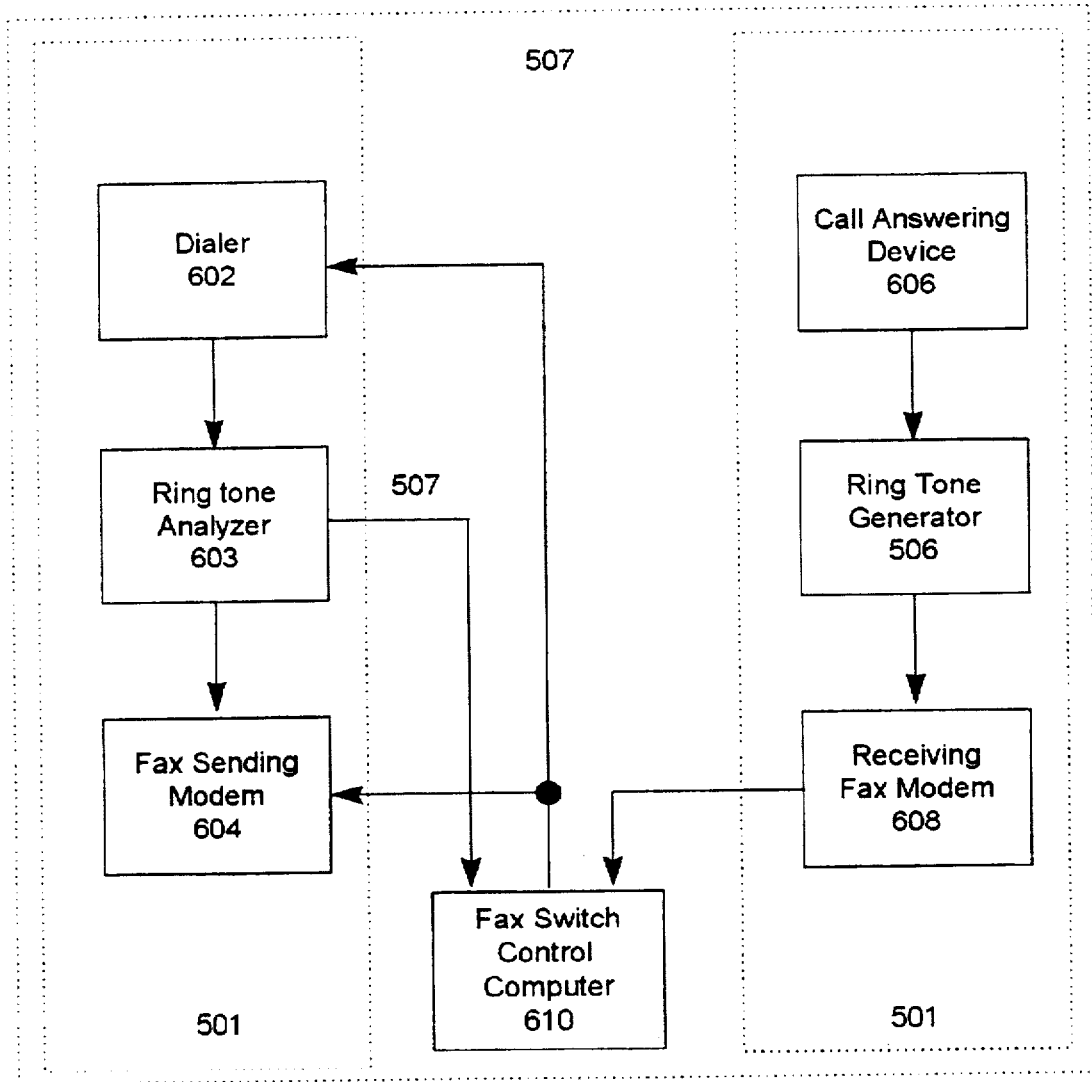
FIG. 6 is a detailed block diagram of the fax switch of FIG. 5 showing the components of the fax switch that are necessary for implementing never busy fax service using a unique ring tone signal.

FIG. 6 shows the fax switch 507 in more detail. The fax sending hardware of 501 consists of three main components: a dialer 602, ring tone analyzer 603, and a fax sending modem 604. The receiving hardware of 501 of the fax switch 507 comprises a call answering device 606, the ring tone generator 506, and a receiving fax modem 608. The entire fax switch 507 is controlled by a fax switch control computer 610. The computer commands the dialer to make a call to the customer's fax phone line. When the incoming call is received, the ring tone generator produces the signature ring signal for approximately 3 seconds. Meanwhile, the fax sending hardware has connected the ring tone analyzer to the outgoing line. If the ring tone analyzer hears the fax server's signature in the incoming ring tone, it disconnects the incoming call without answering the call (defined as an "off hook" signal to the phone company which causes billing to begin). This disconnect ripples through the phone network and causes the outgoing line to be dropped. If the ring tone analyzer does not hear the signature in the ring tone, it assumes that it has actually reached the customer's fax machine and begins transmitting its stored fax to the customer. On the incoming side of the fax switch, if the incoming line is still active after 3 seconds of ringing, it can be assumed that the caller is not the fax server because the fax server would have disconnected immediately upon hearing the signature. Consequently, the incoming call is routed to the fax receive modem which answers the call, thus beginning the billing process, and receives the incoming fax. The incoming fax is stored on the computer's hard disk, along with the phone number from which the fax was forwarded.

It is understood that the embodiments described hereinabove are merely illustrative and are not intended to limit the scope of this invention. It is realized that various changes, alterations, rearrangements, substitutions and modifications can be made by those of skill in the art without substantially departing from the spirit and scope of the present invention.

What is claimed is:

1. A method of providing never-busy fax service, comprising the steps of:

activating a forward on busy or a forward on busy/no-answer service on a customer's fax telephone line to forward to a fax server;

receiving a fax forwarded from the customer's fax telephone line and storing the fax at the fax server;

providing a ring-back tone with an imbedded signature at the fax server that uniquely identifies the fax server;

calling the customer's fax telephone line according to a retry schedule;

analyzing the ring-back tone received by the fax server when calling the customer's fax telephone line to detect if the unique signature is present; and disconnecting the telephone call to the customer's fax telephone line if the unique signature is detected or transmitting the stored fax from the fax server to the customer's fax telephone line if the unique signature is not detected.

2. The method according to claim 1, wherein the identity of the customer's fax telephone line is recognized by the fax server by utilizing feature group D.

3. A method of providing a never-busy fax service, comprising the steps of:

activating a forward on busy or a forward on busy/no-answer service on a customer's fax telephone line to forward to a nation-wide toll free telephone number which terminates at a fax server;

utilizing automatic number identification to determine the telephone number of the customer's fax telephone line from which the call is forwarded to the fax server;

receiving forwarded faxes from the customer's fax telephone line and storing the fax at the fax server with the telephone number;

transmitting the stored fax from the fax server to the customer's fax telephone line when the customer's fax telephone line is free by providing a ring-back tone with an imbedded signature at the fax server that uniquely identifies the fax server;

calling the customer's fax telephone line according to a retry schedule;

analyzing the ring-back tone received by the fax server when calling the customer's fax telephone line to detect if the unique signature is present; and disconnecting the telephone call to the customer's fax telephone line if the unique signature is detected or transmitting the stored fax from the fax server to the customer's fax telephone line if the unique signature is not detected.

4. A method of providing never-busy fax service, comprising the steps of:

activating a forward on busy or a forward on busy/no-answer service on a customer's fax telephone line to forward to a fax server;

receiving a fax forwarded from the customer's fax telephone line and storing the fax at the fax server;

transmitting the stored fax with the imbedded signature from the fax server to the customer's fax telephone line according to a retry schedule;

providing a World Wide Web home page to which the customer can connect using a Web browser and an Internet access provider;

storing current information about a queue of pending stored faxes in a database for each customer on the server, wherein the database is accessible from the World Wide Web; and providing a display for the customer of the queue information represented in the database.

5. The method according to claim 4, wherein the database is accessible by calling a toll-free telephone number and following recorded voice prompts.

6. The method according to claim 4, wherein the identity of the customer's fax telephone line is recognized by the fax server by utilizing feature group D.

* * * * *